US008961796B1

United States Patent
Dlugosz

(10) Patent No.: US 8,961,796 B1
(45) Date of Patent: Feb. 24, 2015

(54) ON-SITE METHOD OF DELIVERING BENTONITE CLAY INTO AN EFFLUENT STREAM

(71) Applicant: Eric Dlugosz, Berkeley Heights, NJ (US)

(72) Inventor: Eric Dlugosz, Berkeley Heights, NJ (US)

( * ) Notice: Subject to any disclaimer, the term of this patent is extended or adjusted under 35 U.S.C. 154(b) by 0 days.

(21) Appl. No.: 13/932,793

(22) Filed: Jul. 1, 2013

Related U.S. Application Data

(63) Continuation of application No. 11/944,925, filed on Nov. 26, 2007, now abandoned, and a continuation of application No. 10/445,593, filed on May 27, 2003, now abandoned.

(60) Provisional application No. 60/385,229, filed on Jun. 30, 2002.

(51) Int. Cl.
*C02F 1/28* (2006.01)
*C02F 101/38* (2006.01)
*C02F 103/02* (2006.01)

(52) U.S. Cl.
CPC ............. *C02F 1/286* (2013.01); *C02F 2101/38* (2013.01); *C02F 1/281* (2013.01); *C02F 2103/023* (2013.01)

USPC ............................................ 210/662; 210/691

(58) Field of Classification Search
CPC ...... C02F 1/281; C02F 1/286; C02F 2101/38; C02F 2103/023
USPC .................................................. 210/662, 691
See application file for complete search history.

(56) References Cited

U.S. PATENT DOCUMENTS

| | | | | |
|---|---|---|---|---|
| 4,021,021 A | * | 5/1977 | Hall et al. ................. | 366/156.1 |
| 4,261,196 A | * | 4/1981 | Scheid, Jr. ................... | 73/32 R |
| 5,169,536 A | * | 12/1992 | Vasconcellos et al. ....... | 210/691 |
| 6,213,315 B1 | * | 4/2001 | Forney et al. .............. | 211/85.15 |

* cited by examiner

*Primary Examiner* — Matthew O Savage
(74) *Attorney, Agent, or Firm* — Hoffmann & Baron, LLP

(57) ABSTRACT

Methods for treating contaminated water from water cooling systems are provided. The inventive methods include treating water contaminated with anti-biofouling quaternary amine compounds with a bentonite clay slurry which has been formed on-site in a mix tank. The slurry is formed on-site by mixing a metered amount of bentonite clay particles with mix water in a mix tank to produce the desired slurry concentration and directly transferring the formed slurry from the mix tank into a flow of the contaminated water, where it mixes with the quaternary ammonium compound and detoxifies it.

10 Claims, 1 Drawing Sheet

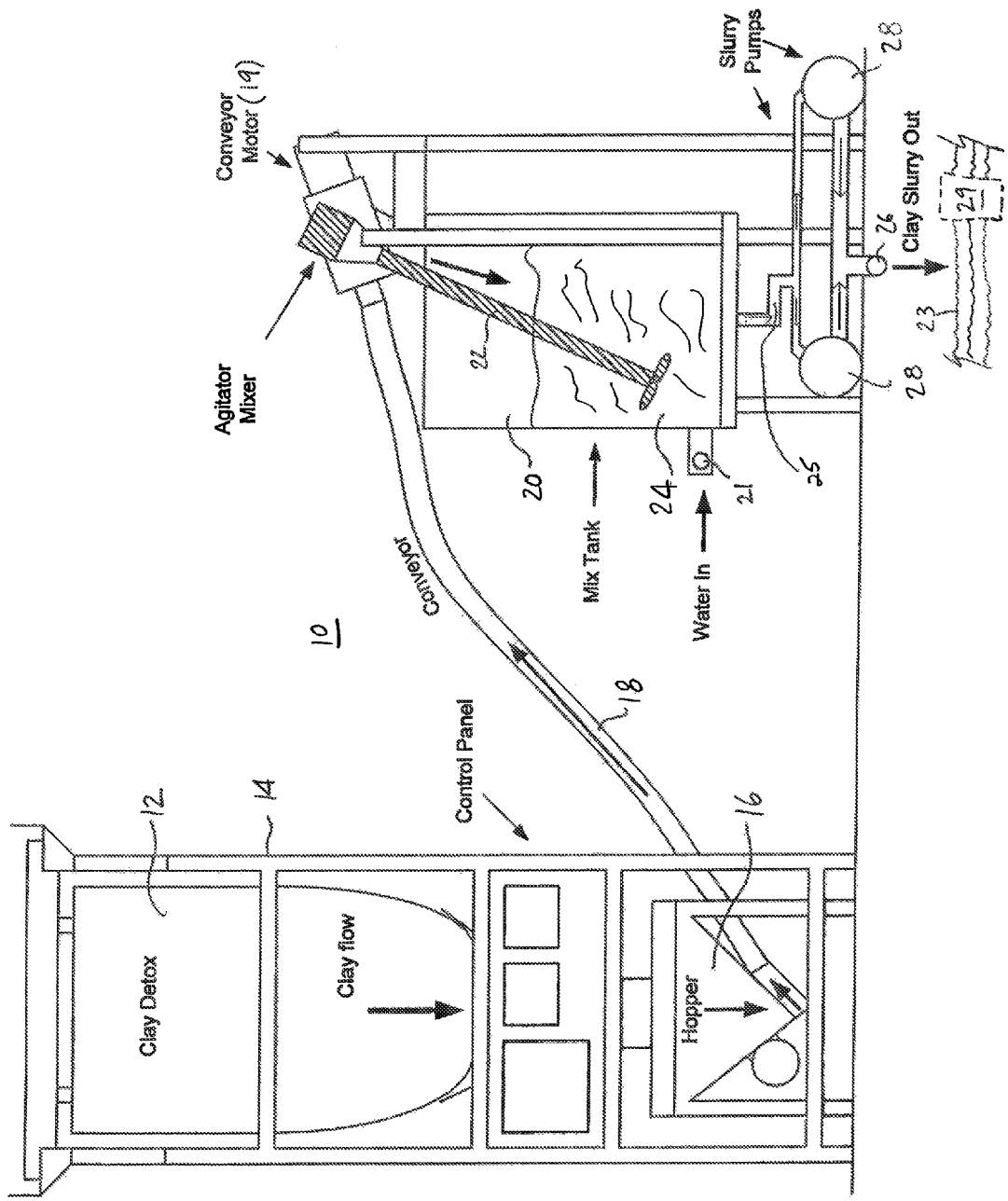

ON-SITE METHOD OF DELIVERING BENTONITE CLAY INTO AN EFFLUENT STREAM

CROSS-REFERENCES TO RELATED APPLICATIONS

This application is a continuation of U.S. application Ser. No. 11/944,925, filed Nov. 26, 2007, now abandoned, which is a continuation of U.S. application Ser. No. 10/445,593, filed May 27, 2003, now abandoned, with claims priority of U.S. Provisional Application No. 60/385,229, filed Jun. 3, 2002, the entire contents of these filings be incorporated by reference herein.

FIELD OF THE INVENTION

This invention relates to preparing a bentonite clay as a detoxifying agent for quaternary ammonium compounds, which are used as micro and macro biocides.

BACKGROUND OF THE INVENTION

Cooling water systems and the associated structures that are submerged in surface waters, fresh water, brackish water and/or salt water provide surfaces for the attachment and accumulation of biological organisms. This accumulation can lead to the formation of organic deposits and serious fouling problems. These fouling problems are wide spread and have been shown to accelerate corrosion of the cooling system and their structures. They have also shown to decrease heat transfer and increase frictional losses. These problems directly affect the cooling system and its performance. Fouling of the cooling system can become so severe that the system may not operate properly or efficiently.

Organic fouling of the system falls into two categories, either micro fouling or macro fouling. Microscopic organisms such as bacteria, fungi and algae cause micro fouling. This would also include their organic by-product deposits. These deposits build on the surface and form a biofilm. This biofilm may also contain inorganic debris, which is intertwined in the deposit. Macro fouling is typically caused by the colonization of larger macro invertebrates, which attach themselves to the structure during the larval state and grow large enough to be seen and felt. Examples would be bivalve mollusks and barnacles. Macro fouling of cooling systems is widespread with over thousands of organisms causing the problems. In salt water/brackish water the primary macro foulers are bivalve mollusks and sometimes barnacles. In fresh water the primary macro foulers are bivalve mollusks, bryozoans and sponges.

Controlling biological fouling of cooling systems can prove difficult. An effective industry method is the use of quaternary ammonium compounds (QACs). These products are registered with the EPA as microbiocides. QACs are cationic surfactants and it is their surface-binding activity that produces antifouling biocidal effects. They are allowed for the use in cooling systems. They have been proven effective at controlling microorganisms, as well as macroorganisms. The QACs are introduced into the cooling water of the systems to control fouling. A major drawback to using these products revolves around their toxicity to other organisms once the water is discharged from the plant. For example, it is known that QACs are actively toxic to fish and other aquatic life. To control the level of QAC in the discharge effluent, bentonite clay slurries (mixture of bentonite clay and water) are used. The slurries are typically mixed off-site and injected at a metered rate into the effluent stream. The bentonite clay reacts with the QAC and reduces its toxicity to an acceptable level in the effluent. In particular, the QACs readily and strongly absorb to clay particles and other negatively charged surfaces. Following absorption, the compounds are degraded by microbes.

A major drawback in using bentonite clay slurries is the large volume of clay slurry, which is needed to effectively detoxify the quaternary ammonium compound. The ratio of clay slurry to quaternary ammonium compound can be up to 80:1 to sufficiently decrease the toxicity level in effluent to within regulatory compliance. This creates a major logistic problem. For example, some applications require over two tank wagons (4,500 gallons each) of clay slurry to properly detox approximately 115 gallons of quaternary ammonium compound. With the clay slurry being mixed off-site, transportation and storage of the large volumes of clay slurry are concerns.

U.S. Pat. No. 4,021,021 ('021) discloses a wetting system for wetting dry powders, such as bentonite clay, with water as part of a clay-polymer water treatment process for producing drinking water. This system includes a wetting tank for receiving water and a continuous flow of fine powder feed. Powder can be fed with variable speed to the tank. Clay powder is dumped onto the surface of the water in the wetting tank where it is mixed to form a clay-water mixture which is continuously withdrawn for transfer to an aging tank to swell before use. The swelled clay-water mixture can be injected into raw water entering a water treatment plant, after which time a suitable polymer can be injected into the water. The water is then directed to a settling tank. The '021 patent does not disclose directly transferring the clay-water mixture from the wetting tank and into an effluent stream. Moreover, this patent does not disclose treating water contaminated with anti-biofouling quaternary amine compounds.

SUMMARY OF THE INVENTION

To overcome deficiencies with the prior art, the subject invention provides an on-site method of preparing bentonite clay slurry for introduction into an effluent stream. In particular, bentonite clay is metered into a continuously flowing stream of water. As the clay is added, it is mixed with water resulting in a clay slurry, which is at least proportional to the amount of quaternary ammonium compound (e.g., molluscicide) being added. The clay slurry is then directly transferred from the mix tank (intermittently or continuously) into the effluent flow. This flow of bentonite clay slurry reacts with the quaternary ammonium compound in the effluent, detoxifying it to a level that is acceptable in the effluent stream.

In particular, the invention provides a method for treating water from water systems that include anti-biofouling quaternary amine compounds. This method includes the steps of: providing water contaminated with anti-biofouling quaternary amine compounds; providing bentonite clay in particulate form; and providing mix water. The mix water is combined with the particulate bentonite clay in a mix tank so as to produce a bentonite clay slurry. The method further includes directly transferring the clay slurry from the mix tank and into the contaminated water to reduce the amount of the contaminating quaternary amine compounds in the water, wherein the amount of the clay slurry used to treat the water is at least sufficient to detoxify the amount of contaminating quaternary amine compounds in the water.

The invention further provides a method for treating effluent water from water systems that include anti-biofouling quaternary amine compounds, wherein the method includes the steps of providing a bentonite clay slurry which has been formed on-site by mixing a metered amount of bentonite clay particles with mix water; and providing effluent water from a water system, the effluent water being contaminated with the anti-biofouling quaternary amine compounds. This method further includes combining the bentonite clay slurry with the contaminated effluent water to reduce the amount of contaminating quaternary amine compounds, wherein the amount of the bentonite clay slurry is at least proportional to the amount of the contaminating quaternary amine compounds in the effluent water.

BRIEF DESCRIPTION OF THE DRAWINGS

FIG. 1 is a schematic of the subject invention.

DETAILED DESCRIPTION OF THE INVENTION

To describe the subject invention, bentonite clay is initially brought to a site 10 where quaternary ammonium compound is to be detoxified. Bentonite clay 12 is delivered to the site 10, typically in large bulk bags weighing 2,000-3,000 lbs. The bentonite clay 12 is loaded into a frame assembly 14, which suspends the clay 12 above a hopper system 16. The frame 14 and hopper system 16 contain flow promotion equipment, such as paddles, vibrators and agitators, which promote the flow of the bentonite clay 12 into a conveyor system 18. The conveyor system 18 is preferably variable speed. The conveyor system 18 moves the clay 12 from the hopper 16 and carries it to a mix tank 20. The clay 12 leaves the conveyor 18 and enters the mix tank 20. The speed of the conveyor 18 is adjustable (e.g., by conveyor motor 19), which allows for the proportional feed of the bentonite clay 12 to the quaternary ammonium compound to achieve proper detoxification. In particular, the method of the present invention includes, in one embodiment, monitoring and adjusting the amount of the particulate bentonite clay which is delivered to the mix tank so as to produce the desired concentration of the clay slurry to achieve sufficient detoxification. Mix water is added to the mix tank 20 by any suitable means. In one embodiment, the mix water is pumped (e.g., pump 21) into the mixed tank from an inlet in the mix tank. Flow of the mix water to the mix tank is desirably monitored and adjusted to maintain the correct continuous flow for producing the desired concentration of the clay slurry. The mix water and bentonite clay 12 are preferably mixed together with the use of a high volume, high shear mixer 22 to form bentonite clay slurry 24. The mix level in the mix tank 20 maintains relatively constant during the operation. An overflow system exists, in which any excess flows are captured and added to the contaminated water to ensure detoxification. In one embodiment, as the clay 12 and water are mixed together, they are continuously pumped (as the bentonite clay slurry 24) from the mix tank 20 into contaminated water flow 23. Preferably, the direct transfer of the clay slurry from the mix tank 20 and into the contaminated water occurs through a fluid communication line 25 between the mix tank 20 and a flow of contaminated water. Desirably, the bentonite clay 24 is pumped using any technique known to those skilled in the art, such as one or more centrifugal pumps 28 through outlet 26 and into contaminate water flow. The pump(s) 28 aid in further mixing of the bentonite slurry 24 before it enters the water flow. In one embodiment of the present invention, the clay slurry is metered into the water flow. In another embodiment, the water flow is effluent from a water system, such as a water cooling system.

Specific gravity samples are used to monitor the consistency of the bentonite clay slurry 24. These have been calibrated with weighed measurements, which are captured from the conveyor 18. Monitoring is an essential part of the application ensuring consistent delivery of the bentonite clay 12 via the bentonite clay slurry 24. After the clay slurry 24 is pumped into the contaminated water, it mixes with the quaternary ammonium compound, detoxifying it. Increasing the level of the clay slurry 24 reduces the level of quaternary ammonium compounds in the contaminated water.

Following treatment of the water with the clay slurry, the slurry-treated water can be passed through a filter 29 to yield water suitable for disposal or reuse.

The major advantage of initially starting with bentonite clay 12 at the site is that the ratio for detox of the bentonite clay 12 to quaternary ammonium compound is approximately 5:1, approximately 16 times less than the effective volume of bentonite clay slurry. The subject invention greatly reduces the volume of initial material required to be transported to the site and/or placed into storage. In other words, the volume of the required bentonite clay 12 is much less than an equally-effective amount of bentonite clay slurry.

This process cannot only be used for systems which are on-line and flowing, but can also be used in the treatment of off-line systems.

What is claimed is:

1. A method for treating water from water systems that include anti-biofouling quaternary amine compounds, the method comprising the steps of:
    providing water contaminated with anti-biofouling quaternary amine compounds;
    providing bentonite clay in particulate form at a determined rate, wherein said determined rate being adjustable;
    providing mix water at a determined rate, wherein said determined rate being adjustable;
    combining said mix water with said particulate bentonite clay in a mix tank on-site with said water contaminated anti-biofouling quaternary amine compounds to produce a bentonite clay slurry at a determined concentration; and
    directly transferring said clay slurry by pipe flow through a fluid communication line from said mix tank and into said contaminated water contaminated with anti-biofouling quaternary amine compounds to reduce the amount of said quaternary amine compounds in said water;
    wherein the amount and the concentration of said clay slurry are at least sufficient to detoxify the amount of said quaternary amine compounds in said water,
    wherein the rates of said bentonite clay and said mix water are adjustable to ensure that the amount and the concentration of said clay slurry are at least sufficient to detoxify the amount of quaternary amine compounds in said water,
    wherein the combining step comprises adjusting the determined rate of said particulate bentonite clay delivered to said mix tank to produce the determined concentration of said clay slurry, and
    wherein the combining step comprises adjusting the determined rate of said mix water to said mix tank to produce the determined concentration of said clay slurry.

2. The method of claim 1, wherein the step of providing said particulate clay comprises moving said particulate clay from a frame assembly to a hopper system.

3. The method of claim 2, wherein the step of providing said particulate clay further comprises moving said particulate clay from said hopper system to a conveyor system.

4. The method of claim 3, wherein the step of providing said particulate clay further comprises moving said particulate clay at variable speed from said conveyor system to said mix tank.

5. The method of claim 1, wherein the combining step comprising mixing said mix water with said particulate clay with a high volume, high shear mixer in said mix tank to form said clay slurry.

6. The method of claim 1, wherein the direct transferring step comprises continuously pumping said clay slurry from said mix tank into contaminated water flow.

7. The method of claim 6, wherein said clay slurry is metered into said water flow.

8. The method of claim 1, wherein the method further comprises passing the water that has been treated with said clay slurry through a filter to yield water suitable for disposal or reuse.

9. The method of claim 1, wherein the consistency of said clay slurry is monitored by specific gravity sampling of said clay slurry.

10. The method of claim 1, wherein said water is effluent from a water cooling system.

\* \* \* \* \*